United States Patent
Ozbilgin

(10) Patent No.: US 11,814,044 B2
(45) Date of Patent: Nov. 14, 2023

(54) RESOLVING RANGE RATE AMBIGUITY IN SENSOR RETURNS

(71) Applicant: MOTIONAL AD LLC, Boston, MA (US)

(72) Inventor: Guchan Ozbilgin, Pittsburgh, PA (US)

(73) Assignee: Motional Ad LLC, Boston, MA (US)

( * ) Notice: Subject to any disclaimer, the term of this patent is extended or adjusted under 35 U.S.C. 154(b) by 198 days.

(21) Appl. No.: 17/148,466

(22) Filed: Jan. 13, 2021

(65) Prior Publication Data
US 2021/0229662 A1 Jul. 29, 2021

Related U.S. Application Data

(60) Provisional application No. 62/965,409, filed on Jan. 24, 2020.

(51) Int. Cl.
| | |
|---|---|
| G01S 13/08 | (2006.01) |
| B60W 30/095 | (2012.01) |
| G01S 13/931 | (2020.01) |
| G01S 7/40 | (2006.01) |
| B60W 30/09 | (2012.01) |
| B60W 60/00 | (2020.01) |

(52) U.S. Cl.
CPC ........ *B60W 30/0956* (2013.01); *B60W 30/09* (2013.01); *B60W 60/0015* (2020.02); *G01S 7/40* (2013.01); *G01S 13/08* (2013.01); *G01S 13/931* (2013.01); *B60W 2420/42* (2013.01); *B60W 2420/52* (2013.01); *B60W 2420/54* (2013.01); *B60W 2555/20* (2020.02)

(58) Field of Classification Search
None
See application file for complete search history.

(56) References Cited

U.S. PATENT DOCUMENTS

| 8,559,491 B2 | 10/2013 | Chevalier et al. |
| 11,016,184 B2 | 5/2021 | Beer et al. |

(Continued)

OTHER PUBLICATIONS

Merrill I. Skolnik, 36—Radar, Editor(s): Wendy M. Middleton, Mac E. Van Valkenburg, Reference Data for Engineers (Ninth Edition) (Year: 2002).*

(Continued)

*Primary Examiner* — Timothy A Brainard
*Assistant Examiner* — Hailey R Le
(74) *Attorney, Agent, or Firm* — Knobbe, Martens, Olson & Bear, LLP

(57) ABSTRACT

A method includes transmitting a first transmitted signal corresponding to a first range rate window size; receiving a first received signal; determining a first detected range rate of an object based on the first received signal; transmitting a second transmitted signal corresponding to a second range rate window size; receiving a second received signal; determining a second detected range rate of the object based on the second received signal; computing a first range rate window index based on a first range rate window index difference; in accordance with a determination that the first range rate window index meets predefined criteria, computing an estimated range rate based on the first range rate window index difference; and in accordance with a determination that the first range rate window index does not meet the predefined criteria, foregoing computing an estimated range rate based on the first range rate window index difference.

24 Claims, 15 Drawing Sheets

(56) References Cited

U.S. PATENT DOCUMENTS

| | | | |
|---|---|---|---|
| 2010/0023245 A1 | 1/2010 | Huang et al. | |
| 2011/0267223 A1 | 11/2011 | Jin et al. | |
| 2013/0093617 A1* | 4/2013 | Christopher | G01S 7/2923 342/146 |
| 2013/0141270 A1* | 6/2013 | Rodenbeck | G01S 13/0209 342/21 |
| 2016/0124086 A1 | 5/2016 | Jansen et al. | |
| 2017/0322298 A1* | 11/2017 | Beitelspacher | G01S 13/22 |
| 2020/0233076 A1* | 7/2020 | Chen | G01S 7/4865 |
| 2021/0199787 A1* | 7/2021 | Emadi | G01S 13/931 |

OTHER PUBLICATIONS

Li, K. et al., "Multitarget Tracking with Doppler Ambiguity", IEEE Transactions on Aerospace and Electronic Systems, Oct. 2013, vol. 49(4), pp. 2640-2656.

Narasimhan, R.S. et al., "An Efficient Algorithm for Range, Range Rate Ambiguity Resolution in MPRF Pulse Doppler Radars", IEEE Aerospace Conference, 2018, pp. 1-9.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Sheng, L. et al., "An Embedded CPU Based Automatic Ranging System for Vehicles", IEEE Control and Automation, Jul. 2007, in 5 pages.

Great Britain Office Action issued for Application No. GB 2100844.6, dated Oct. 26, 2021.

Chinese Office Action issued for Application No. CN 202110096973.X dated Sep. 6, 2023.

Liu, J. et al., "A Novel Parametric Detection Method for High-Speed Multi-Target", Journal of University of Electronic Science and Technology of China, Jul. 2017, vol. 4, No. 46, pp. 495-500.

Great Britain Office Action issued for Application No. GB 2100844.6, dated Mar. 22, 2023.

\* cited by examiner

RESOLVING RANGE RATE AMBIGUITY IN SENSOR RETURNS

CROSS-REFERENCE TO RELATED APPLICATIONS

This application claims the benefit of U.S. Provisional Patent Application No. 62/965,409, filed Jan. 24, 2020, entitled "RESOLVING RANGE RATE AMBIGUITY IN SENSOR RETURNS," the entire contents of which are hereby incorporated by reference.

FIELD

This description relates to detecting objects with sensors (e.g., RADAR), and in particular, resolving range rate ambiguity in received signals (e.g., for use in navigating an autonomous vehicle).

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to a computer system and techniques for detecting objects in an environment surrounding an autonomous vehicle. Generally, the computer system is configured to receive input from one or more sensors of the vehicle, detect one or more objects in the environment surrounding the vehicle based on the received input, and operate the vehicle based upon the detection of the objects.

For example, for a pair of sensor detections, each having a potentially ambiguous range rate value, a window index is computed for a range rate window index difference based on detected range rates of the detections and range rate window sizes associated with the detections. If the calculated window index meets predefined criteria (e.g., the window index is close to an integer value of −1, 0, or 1), a range rate is computed based on the range rate window index difference.

In some embodiments, a method comprises: transmitting, using one or more transmitters, a first transmitted signal into an environment, the first transmitted signal corresponding to a first range rate window size; receiving, using one or more receivers, a first received signal including at least a portion of the first transmitted signal that has been reflected from an object in the environment; determining, using a processing circuit, a first detected range rate of the object based on the first received signal; after transmitting the first transmitted signal, transmitting, using the one or more transmitters, a second transmitted signal into the environment, the second transmitted signal corresponding to a second range rate window size; receiving, using the one or more receivers, a second received signal including at least a portion of the second transmitted signal that has been reflected from the object in the environment; determining, using the processing circuit, a second detected range rate of the object based on the second received signal; computing, using the processing circuit, a first range rate window index based on a first range rate window index difference, the first detected range rate, the second detected range rate, the first range rate window size, and the second range rate window size; in accordance with a determination that the first range rate window index meets predefined criteria, computing, using the processing circuit, an estimated range rate based on the first range rate window index difference; and in accordance with a determination that the first range rate window index does not meet the predefined criteria, foregoing computing an estimated range rate based on the first range rate window index difference.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
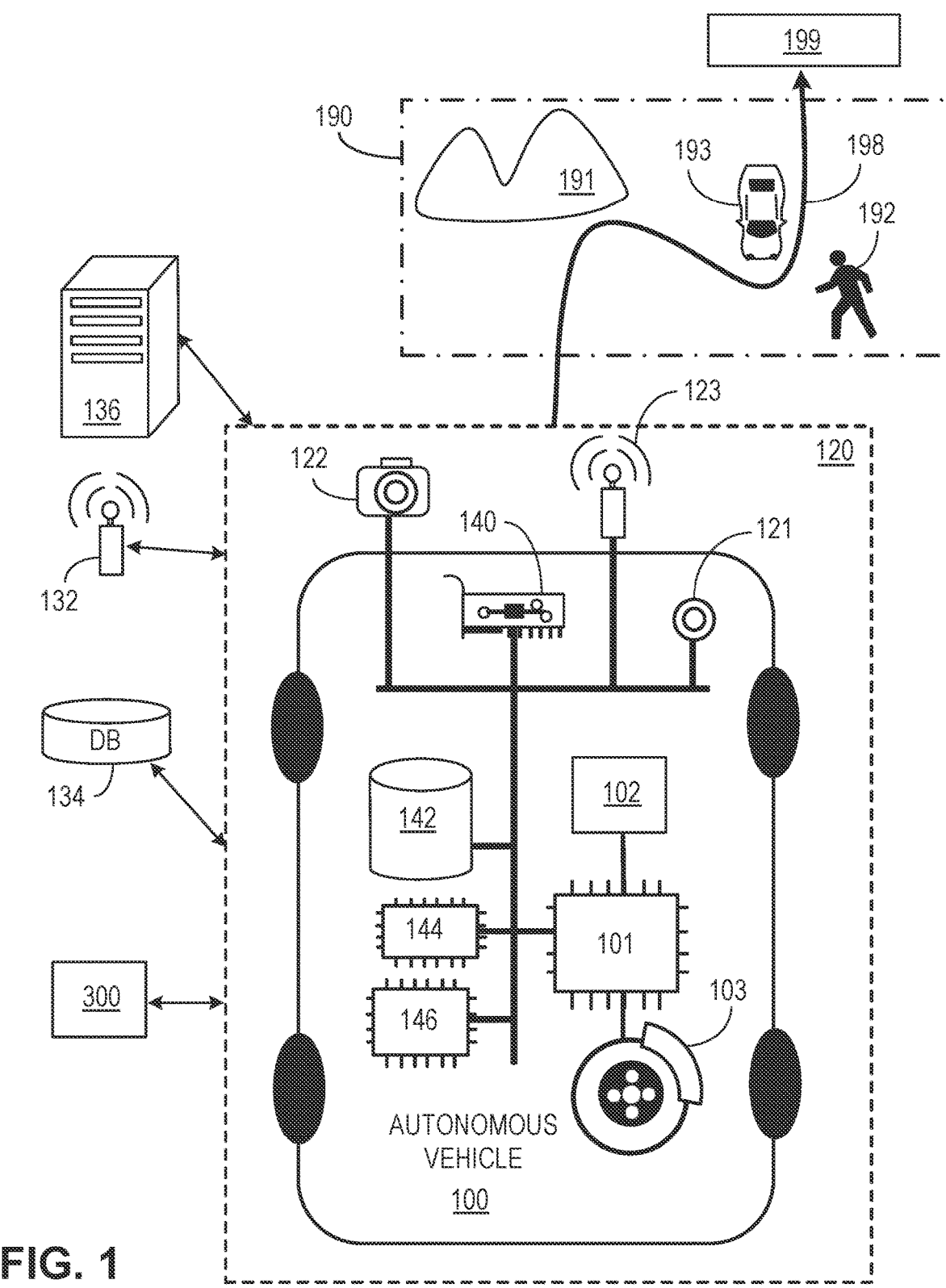
FIG. 1 shows an example of an autonomous vehicle having autonomous capability.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LIDAR or RADAR. One approach for performing object detection includes determining the range rate of a detected object. However, some sensors, such as pulsed RADARs, have potential ambiguity in the range rates that they are capable of detecting. For example, a sensor might be capable of detecting range rates between $v_{min}$ and $v_{max}$. An object with a real range rate of $v_{max}+x$ will be detected by the sensor as having a range rate of $v_{min}+x$ (assuming x is less than the difference between $v_{max}$ and $v_{min}$) due to the limited window of range rates that the sensor is capable of detecting. In this case, the range rate of $v_{max}+x$ is said to be "folded" into the window ($v_{min}$, $v_{max}$). Described herein are techniques for resolving the ambiguity of a detected range rate that results from an object having a range rate outside of the range rate window of the sensor. The process of resolving range rate ambiguity is referred to herein as "unfolding."

Current techniques for resolving ambiguous range rates are computationally inefficient. The disclosed embodiments include systems and techniques for efficiently and quickly resolving range rate ambiguities (e.g., unfolding RADAR returns) of detected objects based on sensor inputs. For example, for a pair of sensor detections, each having a potentially ambiguous range rate, a window index is computed for a range rate window index difference based on detected range rates of the detections and range rate window sizes associated with the detections. If the window index meets predefined criteria (e.g., the window index is close to an integer value of −1, 0, or 1), a range rate is computed based on the window index. An advantage of this techniques is that it can be performed efficiently and outside of a target tracker.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
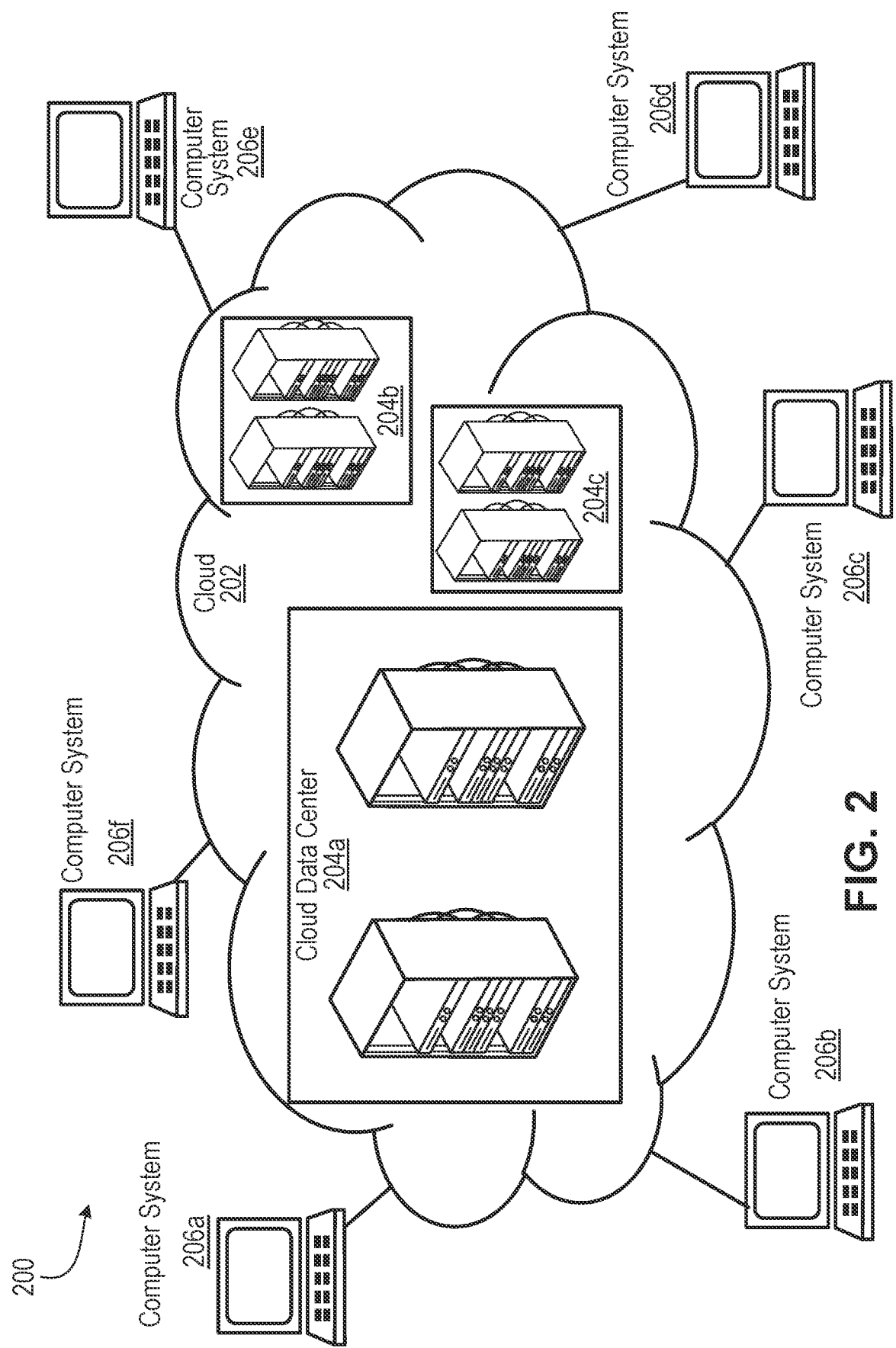
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
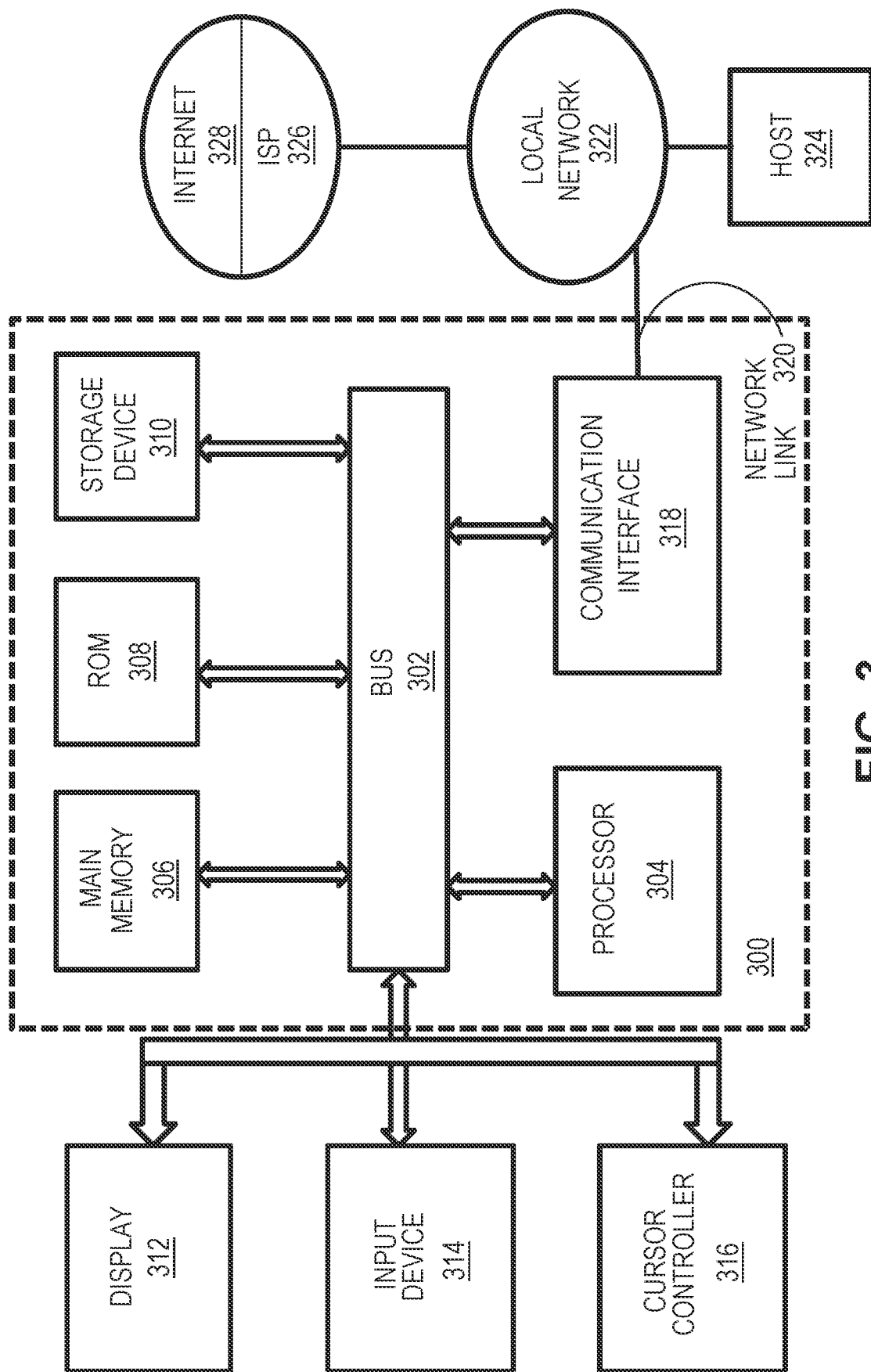
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
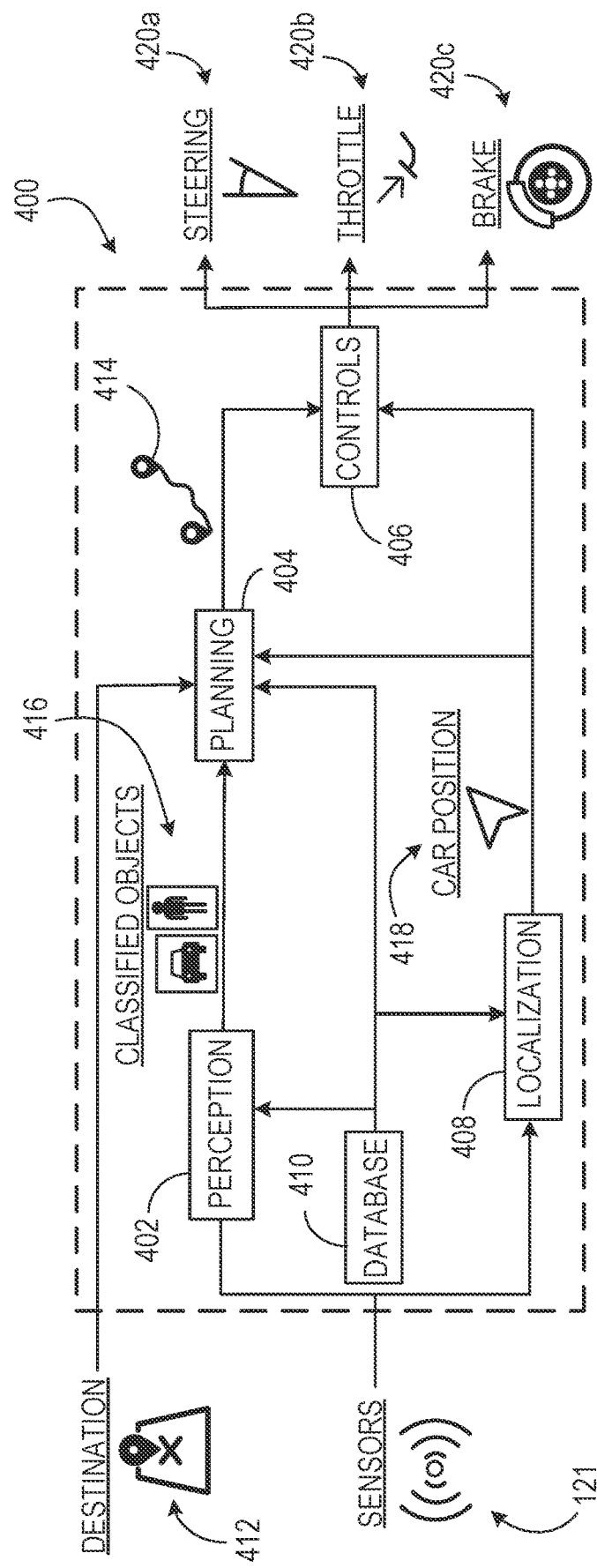
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
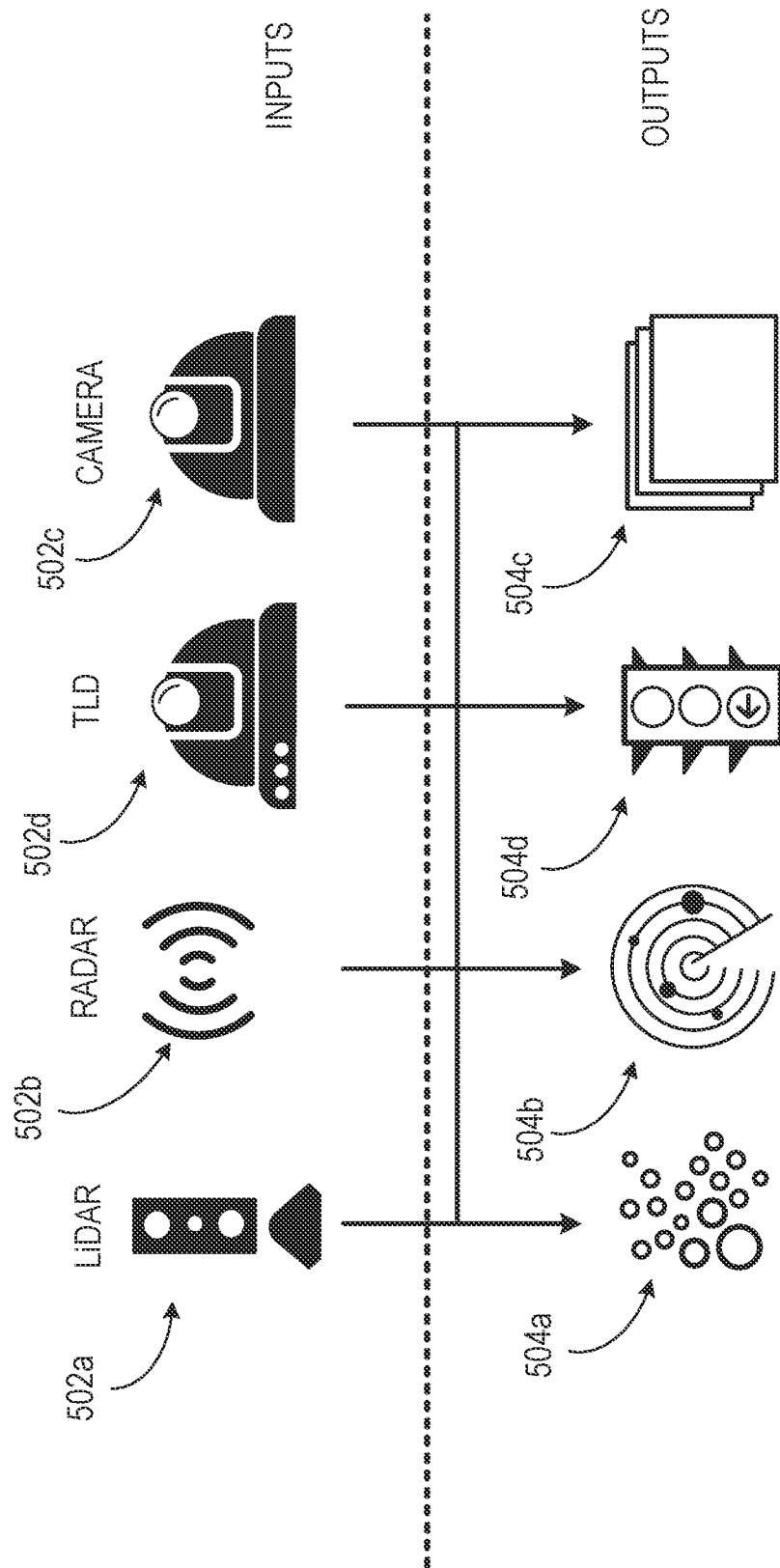
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
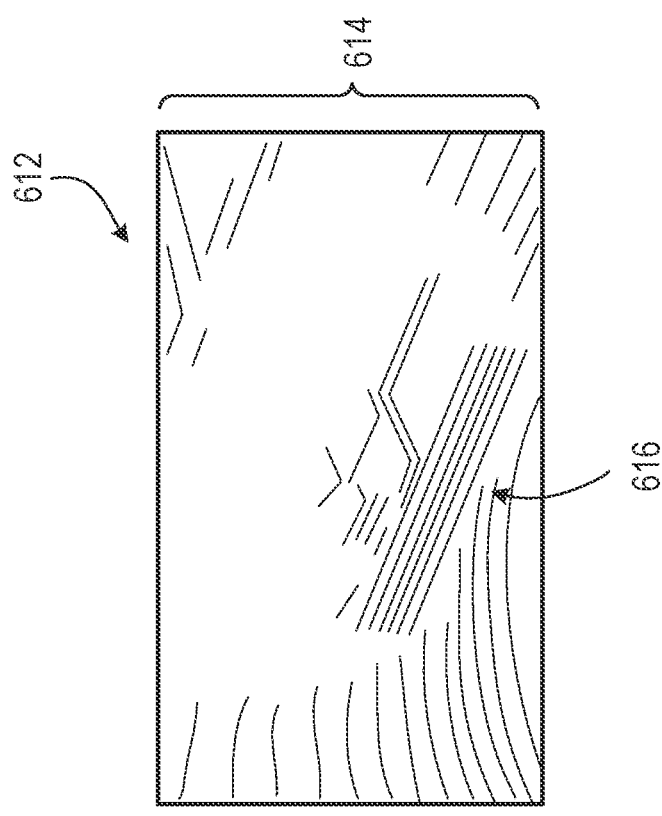
FIG. 6 shows an example of a LiDAR system.
Figure 6:
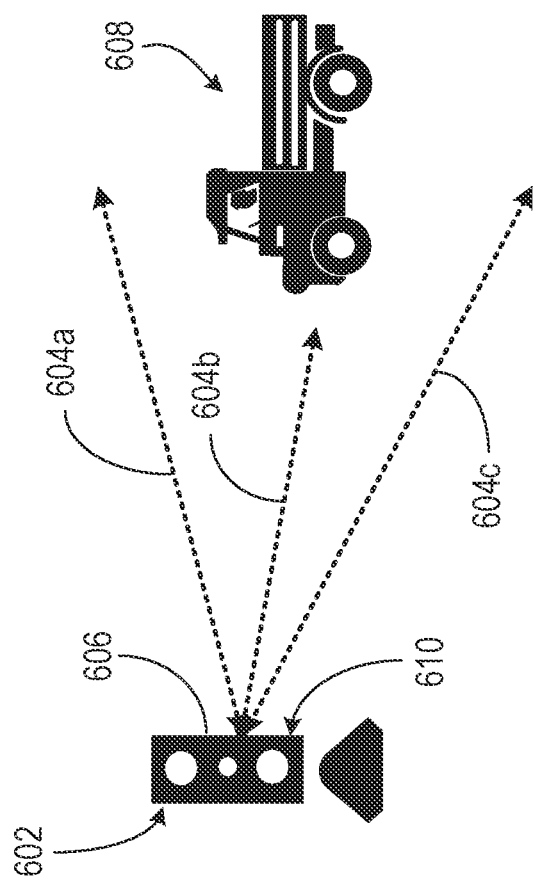

FIG. 6 shows an example of a LiDAR system 602 (e.g., the input 502*a* shown in FIG. 5). The LiDAR system 602 emits light 604*a-c* from a light emitter 606 (e.g., a laser transmitter). Light emitted by a LiDAR system is typically not in the visible spectrum; for example, infrared light is often used. Some of the light 604*b* emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
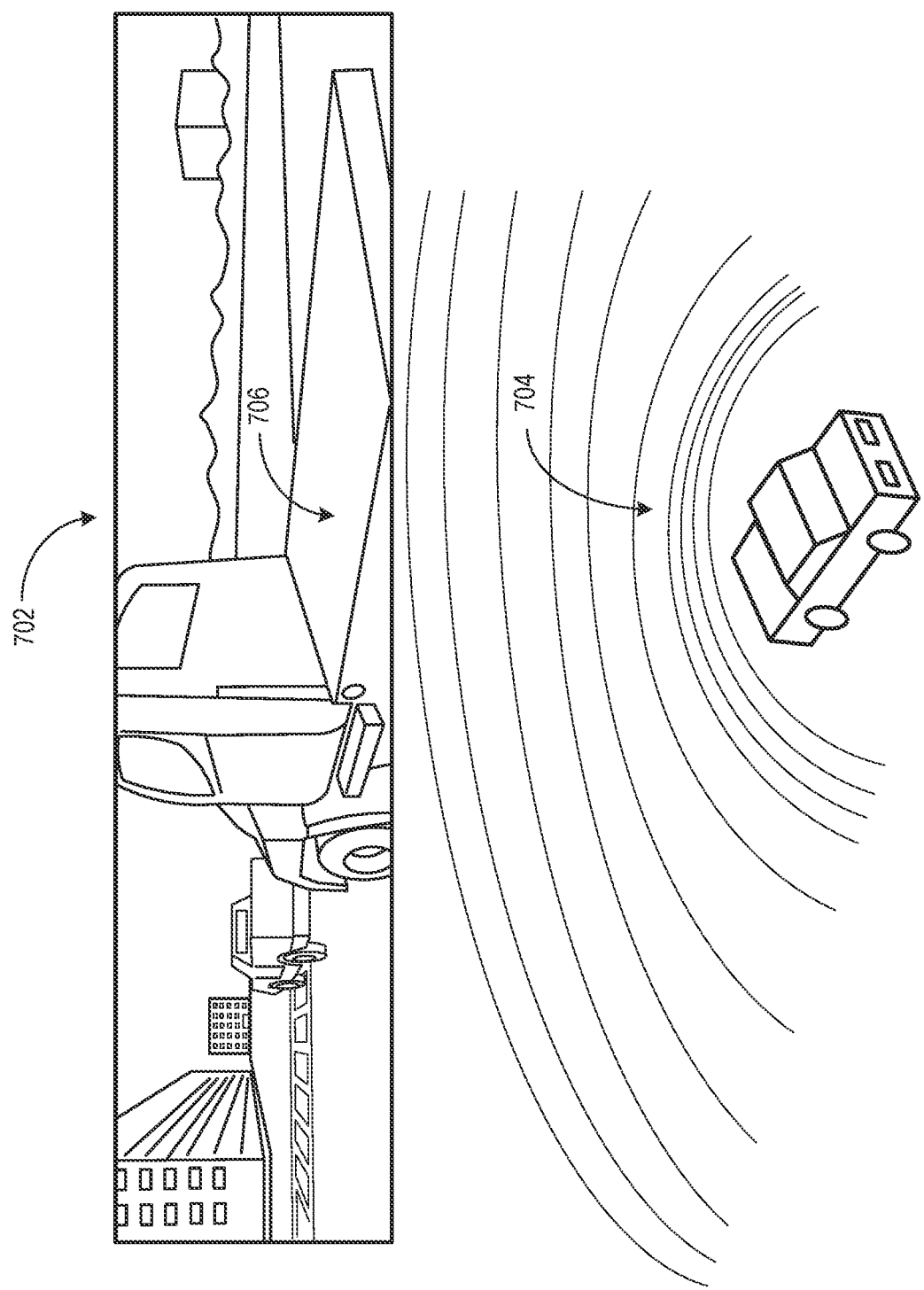
FIG. 7 shows the LiDAR system in operation.

FIG. 7 shows the LiDAR system 602 in operation. In the scenario shown in this figure, the AV 100 receives both camera system output 504*c* in the form of an image 702 and LiDAR system output 504*a* in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
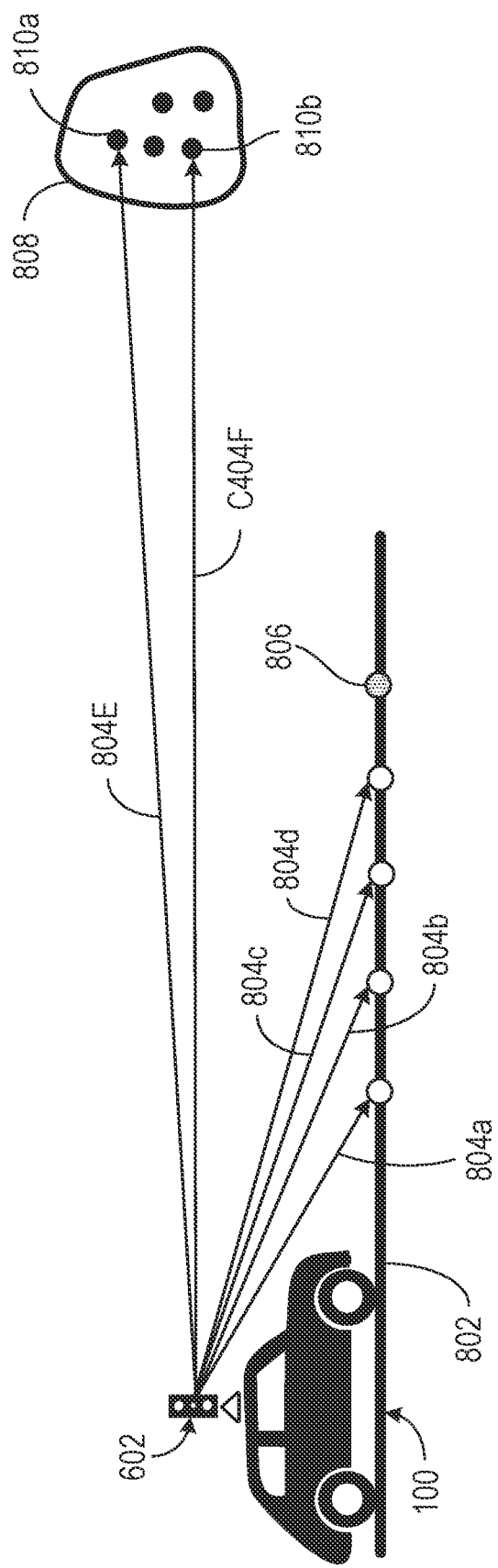
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804*a-d* emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804*e-f* emitted by the LiDAR system 602 will be reflected from points 810*a-b* in a manner inconsistent with the expected consistent manner. From this information, the AV 100 can determine that the object 808 is present.

Path Planning

Figure 9:
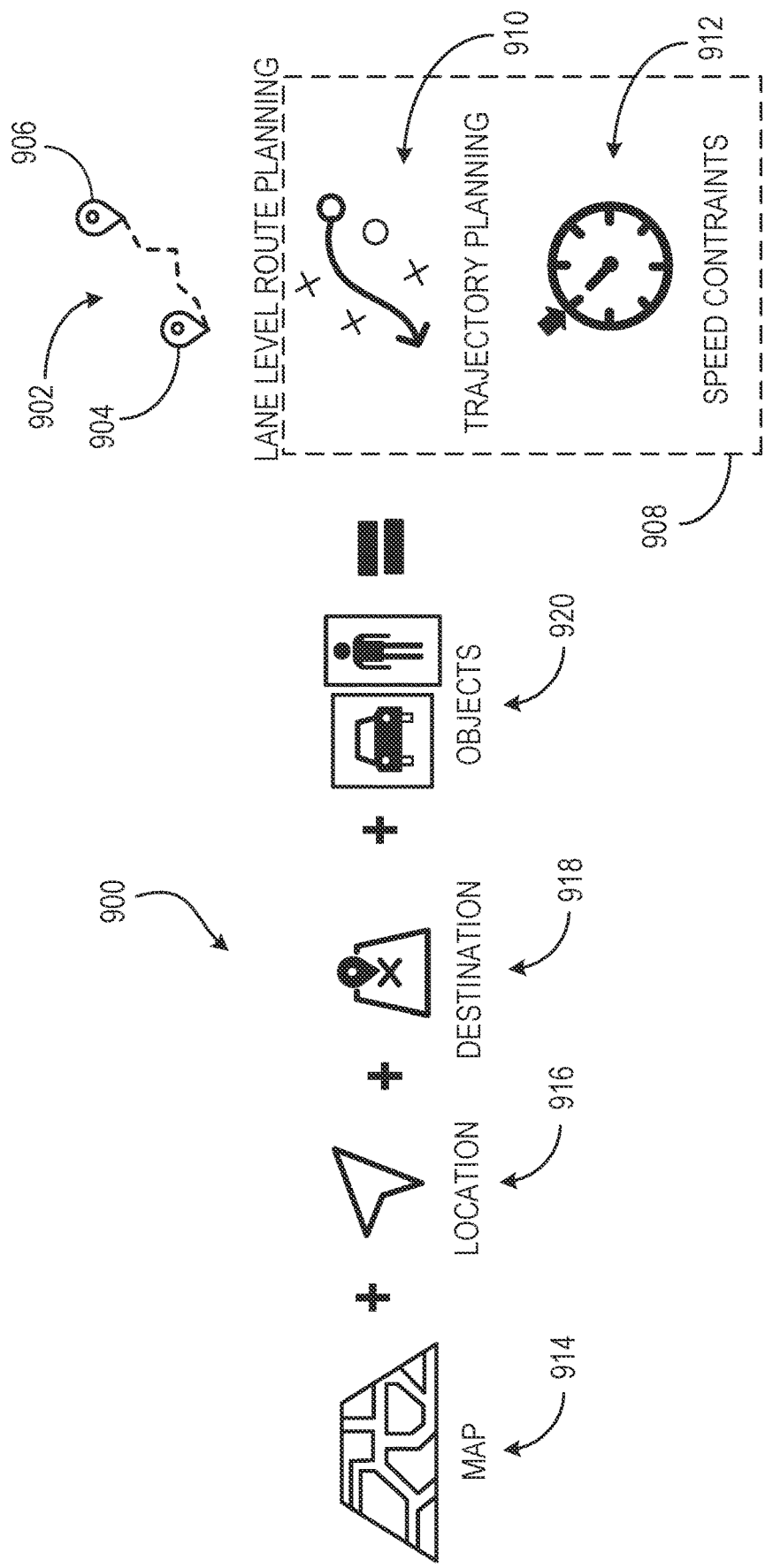
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
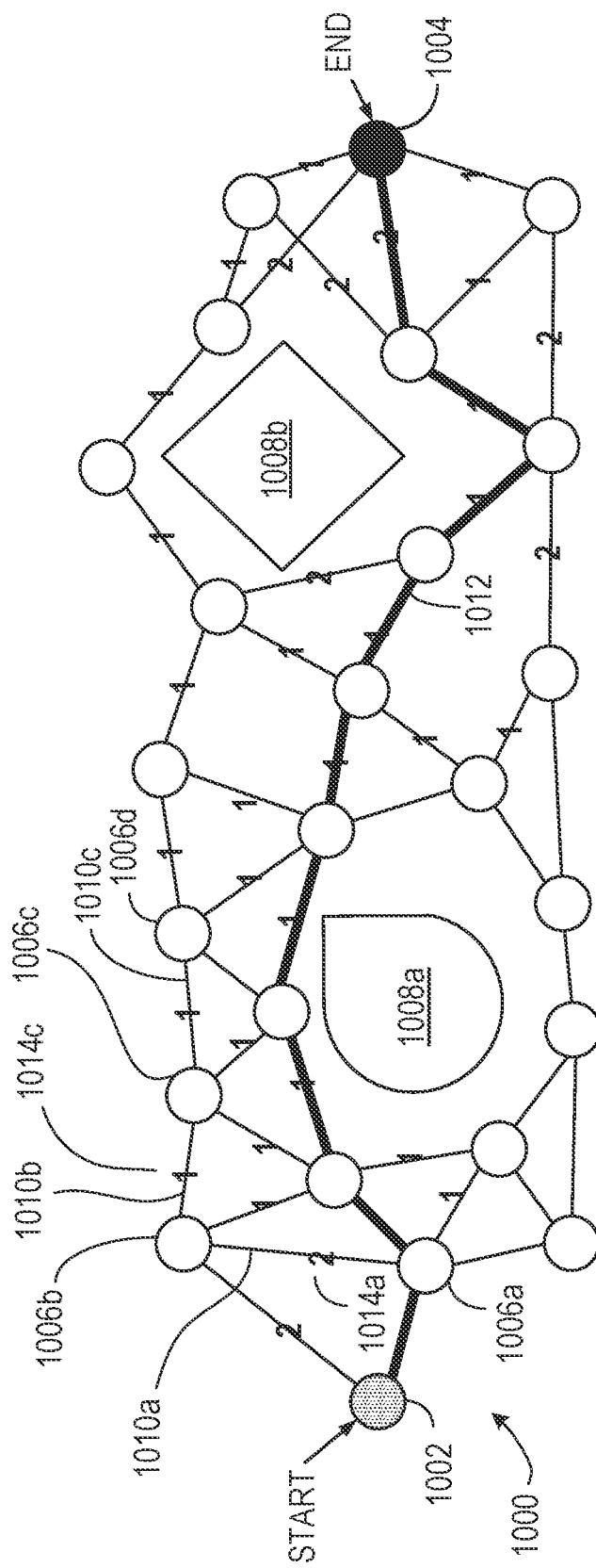
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
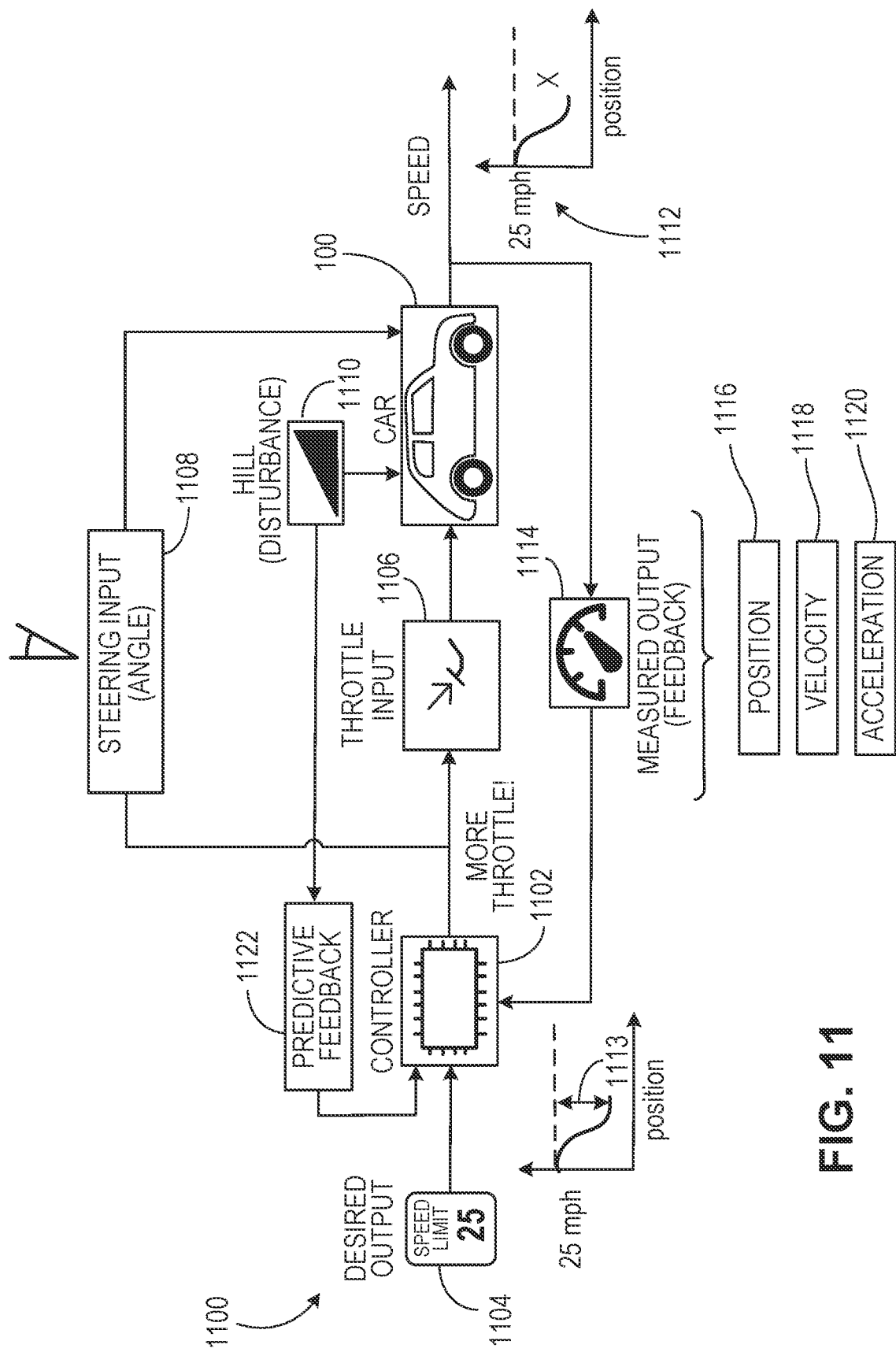
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
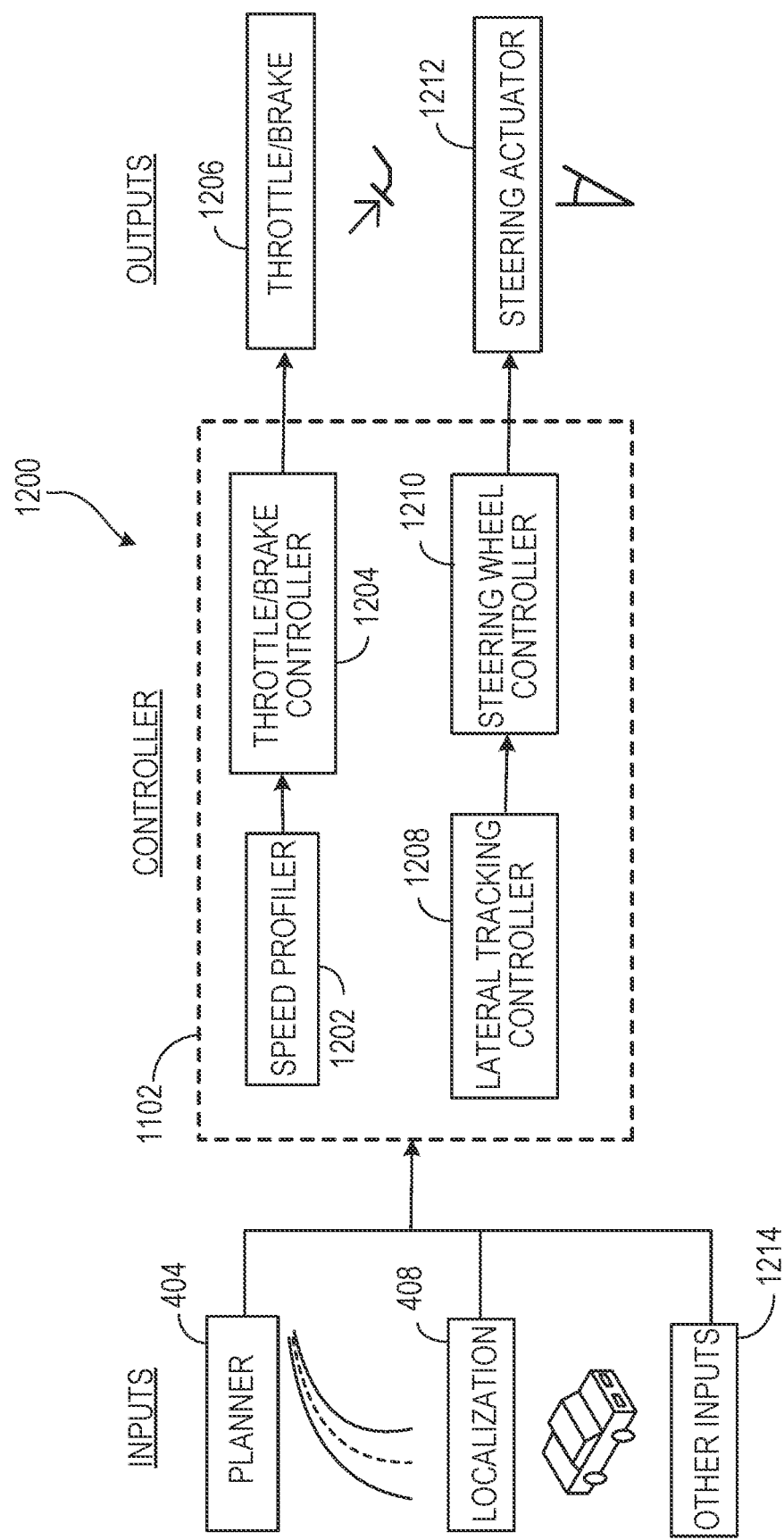
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Computer System for Object Detection

Figure 13A:
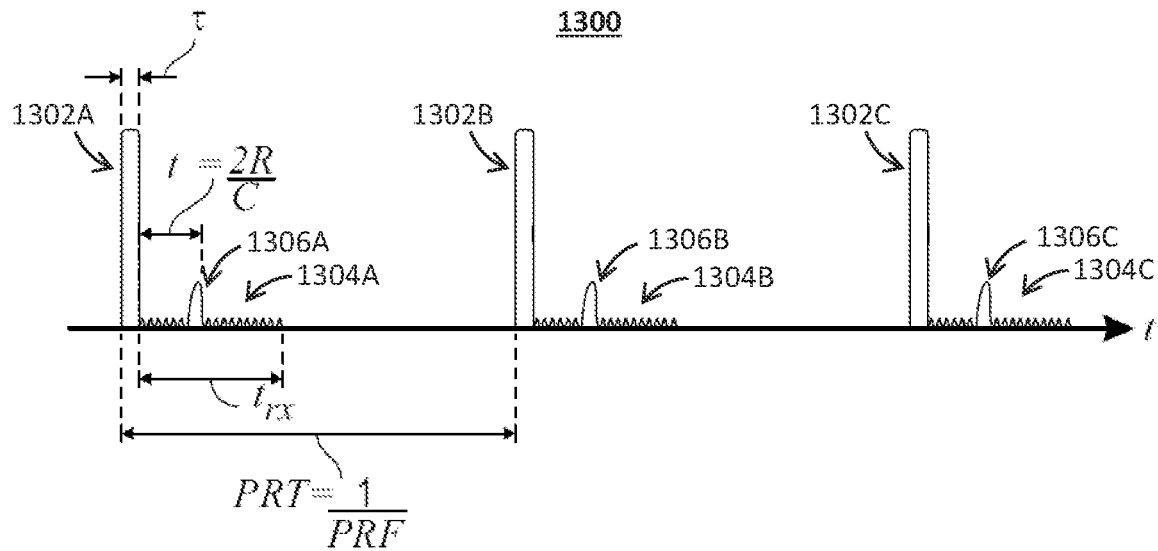
FIGS. 13A-13B show an example of a sensor signal.

FIG. 13A illustrates an exemplary sensor signal 1300 (e.g., a RADAR signal). In particular, FIG. 13A illustrates the amplitude (vertical axis) of sensor signal 1300 over time (horizontal axis). Signal 1300 includes transmitted pulses 1302A, 1302B, and 1302C. In some embodiments, signal 1300 includes one, two, or more than three transmitted pulses. In some embodiments, signal 1300 is referred to as a scan. Transmitted pulses 1302A, 1302B, and 1302C each have a duration (pulse width) of time τ. In some embodiments, the durations of the transmitted pulses in signal 1300 are not all the same. Signal 1300 has a pulse repetition period (pulse repetition time) of PRT, defined by the time from the beginning of one transmitted pulse to the beginning of the next transmitted pulse. The inverse of the pulse repetition period is the pulse repetition frequency.

Signal 1300 includes received signals 1304A, 1304B, and 1304C, corresponding to the signals received immediately following the transmission of transmitted pulses 1302A, 1302B, and 1302C, respectively. For example, received signal 1304A is the signal that is received as a result of transmitted signal 1302A reflecting off of objects in the environment surrounding the sensor toward the receiver. In FIG. 13A, signals are received for a time $t_{rx}$ following transmission of transmitted pulses 1302A, 1302B, and 1302C. Peaks 1306A, 1306B, and 1306C represent the portion of the transmitted pulses 1302A, 1302B, and 1302C, respectively, that were reflected by a relatively strongly reflecting object. The portions of received signals 1304A, 1304B, and 1304C before and after peaks 1306A, 1306B, and 1306C can be non-zero due to noise, such as noise in the receiver, in-band signals from the environment that are not the result of reflection of the transmitted pulses, or reflection of the transmitted pulses from atmospheric elements in the environment.

The range of the object resulting in peaks 1306A, 1306B, and 1306C is determined based on the time t between the peak and the corresponding transmitted pulse, which is the time it takes the transmitted signal to travel to the object and then back to the receiver. The range of object is R=t*c/2.

Figure 13B:
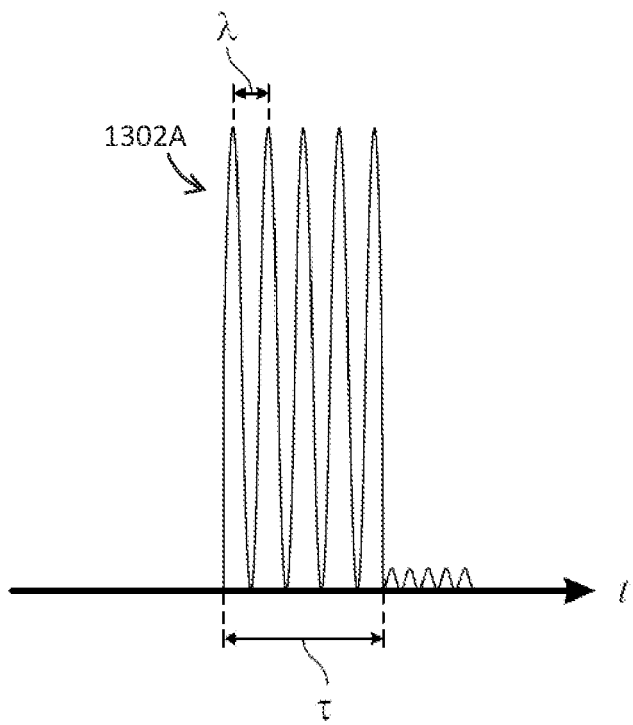

FIG. 13B illustrates a larger-scale depiction of transmitted pulse 1302A. In particular, FIG. 13B depicts the transmitter signal or carrier signal within transmitted pulse 1302A. The transmitter frequency or carrier frequency is 1/λ, where λ is the wavelength of the transmitter signal. In some embodiments, all transmitted pulses in signal 1300 have the same transmitter frequency. In some embodiments, signal 1300 includes transmitted pulses having different transmitter frequencies.

Some sensors use the Doppler effect, in which the frequency of a signal reflected from a moving object is different (or shifted) compared to the frequency of the signal incident on a moving object. The Doppler frequency is represented by $$|f_D| = \frac{2v_r}{\lambda} = \frac{2v_r f_{tx}}{c_0},$$

where $f_D$ is the Doppler frequency, $v_r$ is the radial velocity of the object, $c_0$ is the speed of light, and $f_{tx}$ is the transmitter frequency. The Doppler frequency of the object is measured by detecting the phase of the received signal. For a pulsed signal such as signal 1300, the phase of the received signal is measured (or sampled) at the pulse repetition frequency. According to the Nyquist sampling theorem, a sampling rate of $f_s$ can capture all the information from a signal with frequencies within the window of frequencies between $-f_s/2$ and $f_s/2$. The window has a total width of $f_s$. Frequencies outside the window will create an alias having a frequency within the window. Frequencies outside the window are said to be aliased or folded into the widow.

For systems in which a detected signal may have frequencies outside the window, the detected frequency is ambiguous. That is, a detected frequency will appear within the window, but may actually be caused by a frequency outside the window that has been folded into the window.

The radial velocity (referred to interchangeably as range rate) corresponding to the Doppler frequency is $$v_D = \frac{f_D \cdot c_0}{2 f_{tx}}.$$

Since the sampling frequency for signal 1300 is the PRF, the true radial velocity $v_r$ is folded by Doppler coverage vun (also referred to as the range rate window size), where $$vun = \frac{PRF \cdot c_0}{2 f_{tx}}.$$

So the detected radial velocity is $v_{det}=v_r \pm N^*vun$.

In general, the Doppler coverage window (also referred to as the range rate window) $w_D$ begins at an initial radial velocity $v_0$ and extends for Doppler coverage vun, such that $w_D=(v_0, v_0+vun)$. Doppler coverage vun is referred to herein as the range rate window size. In some embodiments, $$v_0 = -\frac{vun}{2}$$

(e.g., the range rate window is centered on a range rate of 0 m/s).

Figure 14A:
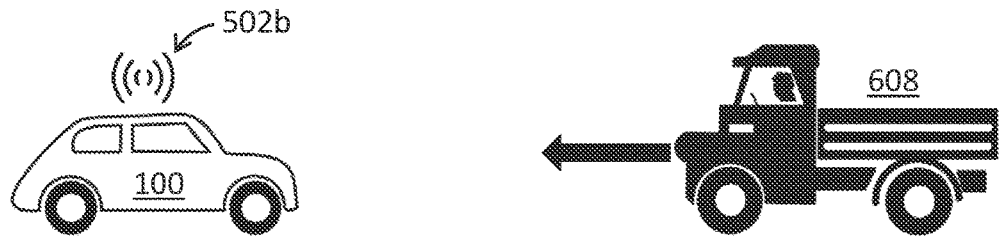
FIG. 14A shows an example of an environment that includes a physical object that is detectable by a sensor.

FIG. 14A illustrates an embodiment with RADAR system 502b mounted on AV 100. Physical object 608 approaches AV 100 with velocity $v_r$ (which is a negative value since physical object 608 is approaching AV 100, thus reducing the range between physical object 608 and AV 100 over time). $v_r$ represents the relative range rate between AV 100 and physical object 608.

Figure 14B:
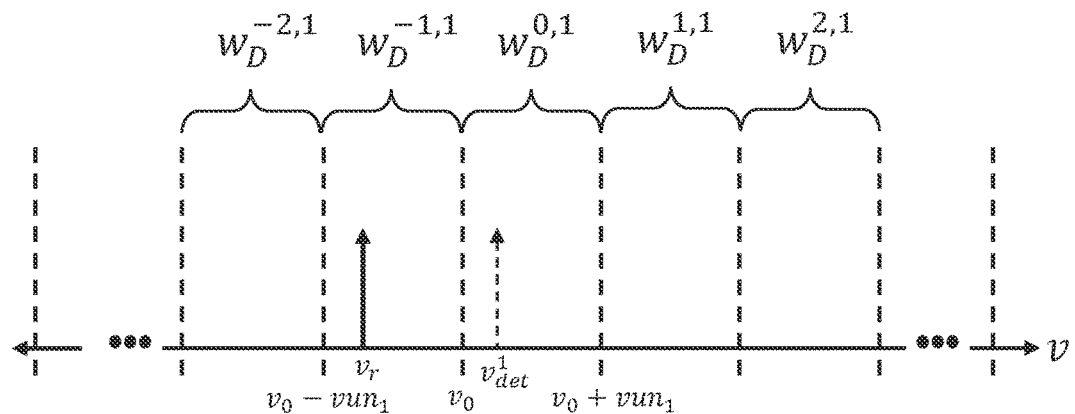
FIG. 14B shows range rate windows corresponding to a first signal of a sensor.

FIG. 14B illustrates range rate windows $w_D^{i,1}$ for a first scan by RADAR system 502b. Based on the characteristics (e.g., PRF and carrier frequency) of the first scan, the first scan provides Doppler coverage $vun_1$. In general, the range rate windows are defined by the relationship: $w_D^{i,j}=(v_0+i \cdot vun_j, v_0+(i+1) \cdot vun_j)$, where i is the window index and j is the scan index.

The true range rate $v_r$ of physical object 608 is indicated by the arrow shown in solid line. Notably, the true range rate $v_r$ is outside of the main Doppler window $w_D^{0,1}$. In the embodiment illustrated in FIG. 14B, true range rate $v_r$ falls within Doppler window $w_D^{-1,1}$. Thus, when physical object 608 is detected by RADAR system 502b, the true range rate $v_r$ of physical object 608 is folded into the main Doppler window $w_D^{0,1}$, such that physical object 608 is detected as having range rate $v_{det}^1=v_r+vun_1$. In general, an object with velocity $v_r$ will have a detected range rate $v_{det}=v_r-n \cdot vun$, where n is the index of the Doppler window in which true range rate $v_r$ falls.

Figure 14C:
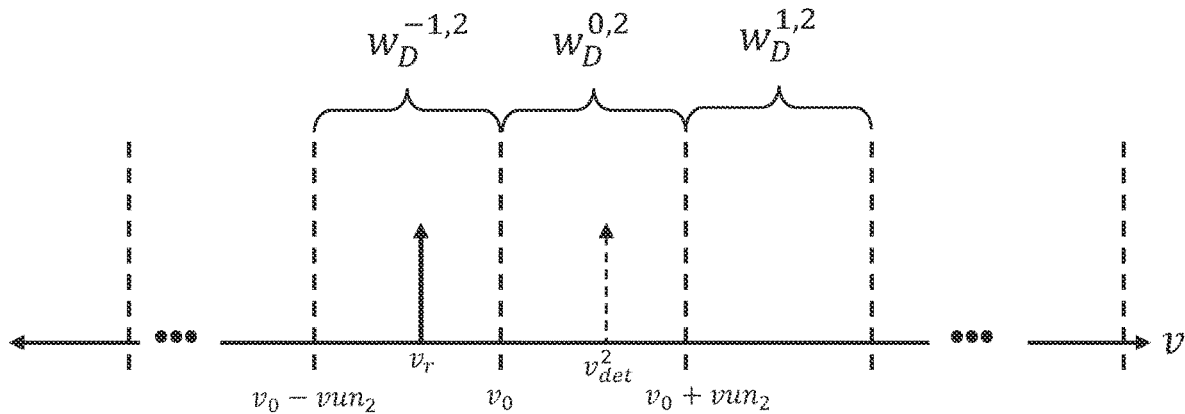
FIG. 14C shows range rate windows corresponding to a second signal of the sensor.

FIG. 14C illustrates range rate windows $w_D^{i,2}$ for a second scan by RADAR system 502b. Based on the characteristics (e.g., PRF and carrier frequency) of the second scan, the second scan provides Doppler coverage $vun_2$. In the embodiment illustrated in FIG. 14C, the Doppler coverage of the second scan is greater than the Doppler coverage of the first scan, as indicated by the width of the Doppler windows $w_D^{i,2}$.

The true range rate $v_r$ of physical object 608 is indicated by the arrow shown in solid line. Notably, the true range rate $v_r$ is outside of the main Doppler window $w_D^{0,2}$. In the embodiment illustrated in FIG. 14C, true range rate vr falls within Doppler window $w_D^{-1,2}$. Thus, when physical object 608 is detected by RADAR system 502b, the true range rate $v_r$ of physical object 608 is folded into the main Doppler window $w_D^{0,2}$, such that physical object is detected as having range rate $v_{det}^2=v_r+vun_2$. Notably, since the Doppler coverage of the second scan is different from the Doppler coverage of the first scan, the detected range rate of the second scan is different from the detected range rate of the first scan, even though the true range rate is of physical object 608 is the same for both scans. This difference is potentially an issue. For example, if the difference in detected range rate is not properly accounted for, the detection of physical object 608 in the second scan may be identified as a detection of a different object or not properly associated with the detection of physical object 608 in the first scan (e.g., for tracking purposes).

The following techniques can be used to unfold the detected range rate of an object to determine the true range rate of the detected object.

The true range rate can be expressed as $v_r=v_{det}^k+N_k \cdot vun_k$, where $v_r$ is the true radial velocity, $v_{det}^k$ is the detected velocity at a time represented by index k (the index k can also correspond to a scan), $N_k$ is the index of the window in which the true range rate falls at the time represented by index k, and $vun_k$ is the Doppler coverage at the time represented by index k.

The true range rate of the detected object can be estimated by finding an acceptable solution to the following equation:

$$v_r = v_{det}^1 + N_1 \cdot vun_1 = v_{det}^2 + N_2 \cdot vun_2, \quad (1)$$

where $v_{det}^1$ and $v_{det}^2$ is are the detected range rates of the first and second scans (respectively), $N_1$ and $N_2$ are the indices of the windows in which the true range rate falls for the first and second scans (respectively), and $vun_1$ and $vun_2$ are the Doppler coverages for the first and second scans (respectively).

Solving equation (1) for $N_1$ provides:

$$N_1 = (v_{det}^1 - v_{det}^2 - vun_2 \cdot N_{diff})/(vun_2-vun_1), \quad (2)$$

where $N_{diff}=N_2-N_1$.

Equation (2) is solved for a value of $N_{diff}$ to obtain $N_{1\_calc}$ (e.g., a calculated value of $N_1$ based on the selected value of $N_{diff}$). For two consecutive scans, it is likely that the true range rate will fall within widows having the same index for both scans (e.g., $N_1=-1$ and $N_2=-1$), or within windows having immediately adjacent indices (e.g., $N_1=0$ and $N_2=-1$); in the first case $N_{diff}=0$, and in the second case $N_{diff}=-1$.

The calculated value of $N_1$ is evaluated against a specified criteria. In some embodiments, the criteria includes a condition that is met if the absolute value of the calculated value of $N_1$ is less than (or less than or equal to) a threshold value (e.g., 2, 3, or 4). For example, a value of $N_1$ with an absolute value above the threshold value could correspond to a range rate that is unlikely to be correct for a particular context. In the AV context, for example, the threshold value can be set to correspond to a maximum expected speed of other vehicles or objects that the AV is reasonably likely to encounter. A value of $N_1$ above the threshold value could correspond to a range rate that is unrealistic under the circumstances (e.g., a range rate that exceeds the maximum likely relative speed between two vehicles).

In some embodiments, the criteria includes a condition that is met if the calculated value of $N_1$ is within a threshold amount of an integer value. As described above, $N_1$ represents an index of the window in which the true range rate falls. In some embodiments, the indices of the windows are integer values, so a calculated value of $N_1$ that is not relatively close to an integer value does not make sense, and indicates that the $N_{diff}$ used to calculate the value of $N_1$ is incorrect (and would result in an incorrect estimate of the true range rate if ultimately used as described below). In some embodiments, the criteria is met if the two conditions described above are met.

If the calculated value of $N_1$ does not meet the specified criteria, then equation (2) is solved for a different value of $N_{diff}$ to obtain another calculated value of $N_1$. In some embodiments, equation (2) is solved for different values of $N_{diff}$ until a calculated value of $N_1$ is obtained that meets the specified criteria. In some embodiments, equation (2) is solved for different values of $N_{diff}$ until a calculated value of $N_1$ is obtained that meets the specified criteria, or until a defined set of values for $N_{diff}$ (e.g., 0, -1, 1) have been used, whichever occurs first.

If the calculated value of $N_1$ meets specified criteria, then the calculated value of $N_1$ and the value of $N_{diff}$ used to calculate $N_1$ are used to calculate $N_{2\_calc}$ (e.g., a calculated value of $N_2$). The calculated value of $N_2$ is then used to determine (e.g., estimate) the true range rate according to the equation $v_{r\_est}=v_{det}^2+N_{2\_calc} \cdot vun_2$.

In some embodiments, the range rate can be estimated directly from the calculated value of $N_1$ without calculating $N_{2\_calc}$) according to the equation $v_{r\_est}=v_{det}^1+N_{1\_calc} \cdot vun_1$.

An exemplary embodiment of the technique described above can be represented in pseudo code as follows:

For $N_{diff}=[0,-1,1]$ Do
  $N_1=(v_{det}^1-v_{det}^2-vun_2 \cdot N_{diff})/(vun_2-vun_1)$
  If($|N_1|$<Threshold1) AND ($|N_1-$(Integer closest to $N_1)|$<Threshold2)
    $N_2=N_1+N_{diff}$
    $v_{r\_est}=v_{det}^2+N_2 \cdot vun_2$
    Break Consider, for example, an embodiment having $v_0=-23$ m/s, $vun_1=35$ m/s, $vun_2=30$ m/s, such that all detections for the first scan are folded into the window (−23 m/s, 12 m/s), and all detections for the second scan are folded into the window (−23 m/s, 7 m/s).

In FIG. 14A, if AV 100 is stationary and physical object 608 is approaching AV 100 at a speed of 32 m/s, then physical object 608 has a true range rate $v_r$=−32 m/s that is outside the main window for both the first and second scans. In this example, the range rate detected by the first scan is vdet1=−32 m/s+35 m/s=3 m/s, and the range rate detected by the second scan is $v_{det}{}^2$=−32 m/s+30 m/s=−2 m/s. Notably, the detected range rate of the first scan is different from the detected range rate of the second scan, and both detected range rates do not reflect the actual range rate of physical object 608. Choosing $N_{\mathit{diff}}$ to be zero, and solving equation (2) provides an $N_{1\_calc}$ value of −1. Since −1 is an integer and has an absolute value that is relatively small (e.g., it is below a threshold value of 3, which corresponds to an approaching range rate of 102 m/s and a separating range rate of 108 m/s based on the detected range rate and Doppler coverage of the first scan), $N_{1\_calc}$ is used to estimate the true range rate. Using $N_1$=−1 and $N_{\mathit{diff}}$=0 provides $N_{2\_calc}$=−1. Using $N_{2\_calc}$=−1 provides $$v_r = -2\ \frac{m}{s} + (-1)*30\ \frac{m}{s} = -32\ \frac{m}{s},$$

which is the real range rate of physical object 608 in this example.

As another example, if AV 100 is stationary and physical object 608 is moving away from AV 100 at a speed of 9 m/s, then physical object 608 has a true range rate $v_r$=9 m/s that is inside the main window for the first scan and outside the main window for the second scan. In this example, the range rate detected by the first scan is $v_{det}{}^1$=9 m/s, and the range rate detected by the second scan is $$v_{det}^2 = 9\ \frac{m}{s} - 30\ \frac{m}{s} = -21\ \frac{m}{s}.$$

Notably, the detected range rate of the first scan is different from the detected range rate of the second scan, and only the detected range rate of the first scan reflects the actual range rate of physical object 608. Choosing $N_{\mathit{diff}}$ to be zero, and solving equation (2) provides an $N_{1\_calc}$ value of −6. Although −6 is an integer, it has an absolute value that is relatively large (e.g., greater than a predefined threshold value). Since the $N_1$ value calculated for an $N_{\mathit{diff}}$ value of 0 does not meet the specified criteria, another value of N1 is calculated for a different value of $N_{\mathit{diff}}$. Choosing $N_{\mathit{diff}}$ to be 1 provides a calculated $N_1$ value of 0, which is an integer and is small. Using $N_1$=0 and $N_{\mathit{diff}}$=1 provides $N_{2\_calc}$=1. Using $N_{2\_calc}$=1 provides $$v_r = -21\ \frac{m}{s} + (1)*30\ \frac{m}{s} = 9\ \frac{m}{s},$$

which is the real range rate of physical object 608 is this example.

In some embodiments, solutions to equation (1) above can be found in other ways. In general, the technique seeks to find a combination of values for $N_1$ and $N_2$ that meets the constraint of equation (1) and which meets specified criteria (e.g., $N_1$ and $N_2$ are the same integer or adjacent integers). Once a combination of $N_1$ and $N_2$ is found that meets the constraint of equation (1) and which meets the specified criteria, the $N_1$ and/or $N_2$ value(s) of the combination are used to estimate the true range rate of the detected object (e.g., unfold the detected range rate according to equation (2) using the detected range rate, the corresponding Doppler coverage, and the $N_1$ and/or $N_2$ value(s) from the selected combination).

Figure 15:
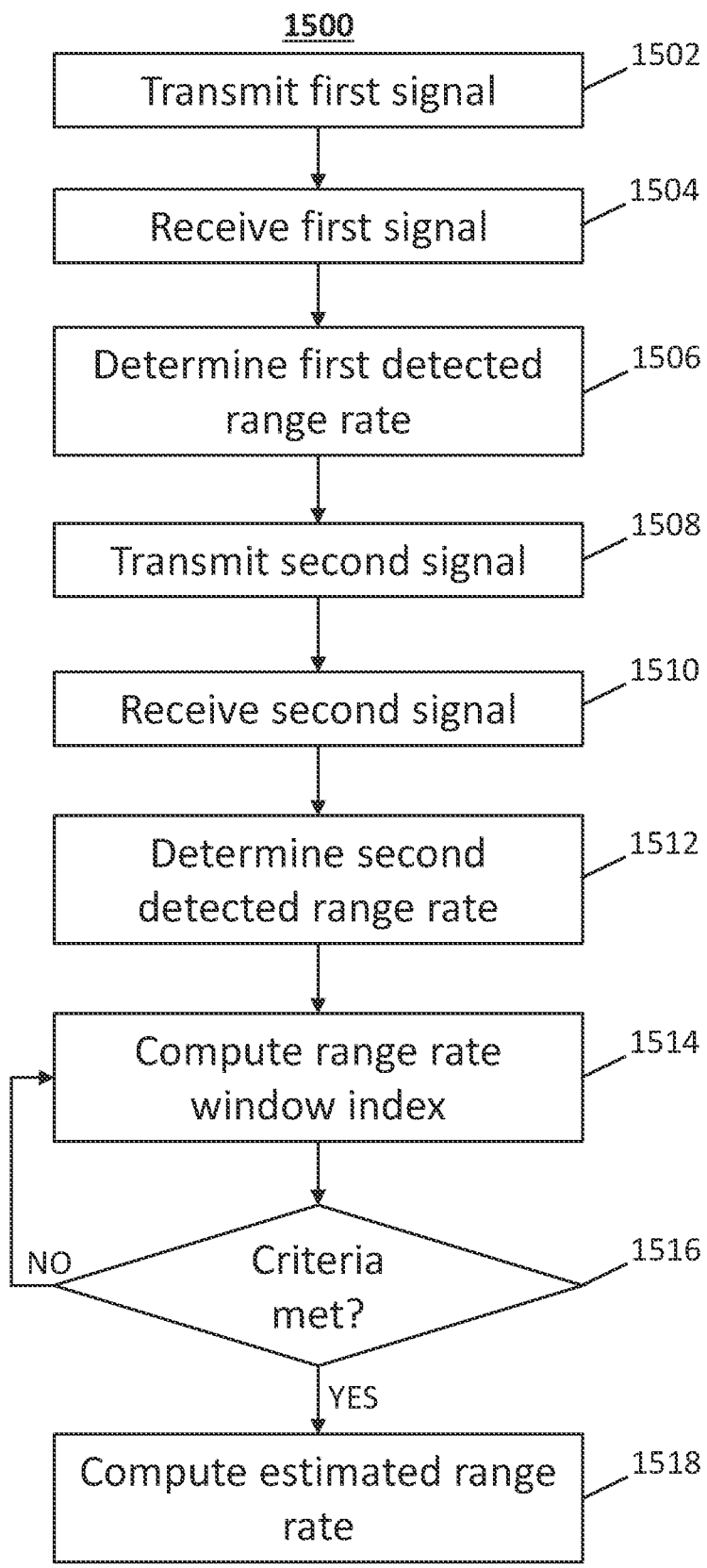
FIG. 15 is a flow chart of an example process for detecting objects in the environment and operating a vehicle based on the detection of the objects.

Example Process for Detecting Objects and Operating the Vehicle Based on the Detection of the Objects FIG. 15 is a flow chart of an example process 1500 (also referred to as a method) for detecting objects in the environment and operating the vehicle based on the detection of objects. For convenience, the process 1500 will be described as being performed by a system of one or more computers located in one or more locations. For example, the AV system 120 of FIG. 1 or computer system 300 of FIG. 3, appropriately programmed in accordance with this specification, can perform the process 1500. Process 1500 can be used to implement the techniques described above with reference to FIGS. 13A-13B and 14A-14C.

At block 1502, a first transmitted signal (e.g., signal 1300; transmitted pulses 1302A-1302C; a first RADAR scan; a plurality of electromagnetic pulses at a first pulse repetition frequency (PRF)) is transmitted into an environment. The first transmitted signal corresponds to a first range rate window size (e.g., $vun_1$; Doppler coverage of the first scan; the first range rate window size corresponds to the first PRF). In some embodiments, the first transmitted signal is transmitted using one or more transmitters (e.g., sensors 121, a RADAR transmitter, a LiDAR light source, ultrasonic sensors, time-of-flight (TOF) depth sensors).

In some embodiments, a range rate window size (e.g., vun) is based on the PRF and transmitter frequency of the transmitted signal $$vun = \frac{PRF \cdot c_0}{2 f_{tx}}$$

In some embodiments, the first transmitted signal includes a first plurality of pulses having a first transmitter frequency and a first pulse repetition frequency, where the first range rate window size corresponds to the first transmitter frequency and the first pulse repetition frequency.

At block 1504, a first received signal (e.g., received signals 1304A-1304C) is received. The first received signal includes at least a portion of the first transmitted signal that has been reflected from an object in the environment (e.g., 1306A-1306C). In some embodiments, the first received signal is received using one or more receivers (e.g., sensors 121, a RADAR receiver or a LiDAR receiver).

At block 1506, a first detected range rate (e.g., $v_{det}{}^1$) of the object is determined based on the first received signal. In some embodiments, the first detected range rate of the object is determined using a processing circuit (e.g., computer processors 146 or processor 304).

At block 1508, after transmitting the first transmitted signal, a second transmitted signal (e.g., signal 1300; transmitted pulses 1302A-1302C; a second RADAR scan; a plurality of electromagnetic pulses at a second PRF) is transmitted into the environment. The second transmitted signal corresponds to a second range rate window size (e.g., $vun_2$; the second range rate window size corresponds to the second PRF). In some embodiments, the second transmitted signal is transmitted using the one or more transmitters. In some embodiments, the second transmitted signal includes a second plurality of pulses having a second transmitter frequency and a second pulse repetition frequency different from the first pulse repetition frequency, where the second range rate window size corresponds to the second transmitter frequency and the second pulse repetition frequency.

In some embodiments, the range rate window size (e.g., Doppler coverage) is different for the two transmitted signals. For example, the first range rate window size is different from the second range rate window size. The different range rate window sizes can produce different detected range rates due to folding (e.g., if the actual object range rate is greater than the first range rate window size and the second range rate window size, and the first and second range rate window sizes are different, the actual object range rate will fold into the window of detectable ranges at a different range rate for the first received signal than for the second received signal).

In some embodiments, the first transmitted signal has a first pulse repetition frequency and the second transmitted signal has a second pulse repetition frequency different from the first pulse repetition frequency. In some embodiments, the transmitter frequency for the first transmitted signal is the same as for the second transmitted signal (e.g., the transmitter frequency remains the same between scans). Changing the PRF can change the range rate window size. In some embodiments, the first range rate window size is based on the first pulse repetition frequency, and the second range rate window size is based on the second pulse repetition frequency and is different from the first range rate window size.

At block 1510, a second received signal (e.g., received signals 1304A-1304C) is received. The second received signal includes at least a portion of the second transmitted signal that has been reflected from the object in the environment (e.g., 1306A-1306C). In some embodiments, the second received signal is received using the one or more receivers The sensor scans (e.g., the first and second transmitted and received signals) can be from the same sensor or different sensors.

In some embodiments, transmitting the first transmitted signal is performed with a first transmitter of the one or more transmitters, and transmitting the second transmitted signal is performed with a second transmitter of the one or more transmitters different from the first transmitter. In some embodiments, transmitting the first transmitted signal and transmitting the second transmitted signal are performed with the same transmitter of the one or more receivers. In some embodiments, receiving the first received signal is performed with a first receiver of the one or more receivers, and receiving the second received signal is performed with a second receiver of the one or more receivers different from the first receiver. In some embodiments, receiving the first received signal and receiving the second received signal are performed with the same receiver of the one or more receivers.

At block 1512, a second detected range rate of the object is determined based on the second received signal (e.g., $v_{det}^2$). In some embodiments, the second detected range rate of the object is determined using the processing circuit.

At block 1514, a first range rate window index (e.g., $N_1$) is computed based at least in part on a first range rate window index difference (e.g., $N_{diff}$, a (hypothesized) difference between the index of the range rate window in which the true range rate exists in the second signal and the index of the range rate window in which the true range rate exists in the first signal). In some embodiments, the first range rate window index difference is an integer (e.g., -1, 0, 1). In some embodiments, the first range rate window index is computed based at least in part on the first range rate window index difference and one or more of the first detected range rate (e.g., $v_{det}^1$), the second detected range rate (e.g., $v_{det}^2$), the first range rate window size (e.g., $vun_1$), or the second range rate window size (e.g., $vun_2$), or a combination thereof. In some embodiments, the first range rate window index is computed using the processing circuit.

In some embodiments, the first range rate window index is computed according to the equation: $N_1 = (v_{det}^1 - v_{det}^2 - vun_2 \cdot N_{diff})/(vun_2 - vun_1)$, where $N_1$ is the first range rate window index, $v_{det}^1$ is the first detected range rate, $v_{det}^2$ is the second detected range rate, $vun_1$ is the first range rate window size, $vun_2$ is the second range rate window size, and $N_{diff}$ is the first range rate window index difference.

Computation of the first range rate window index can be conditioned on the first and second received signals meeting specified criteria (e.g., gating criteria). In some embodiments, computing the first range rate window index is performed in accordance with a determination that gating criteria are met, where the gating criteria are based on the first received signal and the second received signal. Gating criteria can be based on sensor coordinates (range and angle) or global coordinates (Euclidean position) of the detected object. For example, the detected range and/or angle of the object in the first and second received signals must be within a threshold range and/or angle of each other. In some embodiments, the range rate unfolding operations described herein are performed on all associated pairs of detections (e.g., detections from the first and second received signals that meet the gating criteria). In some embodiments, unfolding is performed only on the detection pair that results in minimal cost (e.g., the detection pair with the closest spatial relationship).

Since the detected range rate may be folded (and thus wrong) and result in missed associations (e.g., detections that should be associated but for a difference in detected range rate), the detected range rate can be ignored when evaluating the gating criteria. In some embodiments, the gating criteria are not based on the first detected range rate or the second detected range rate.

At block 1516, a determination is made whether the first range rate window index meets predefined criteria (e.g., whether the index is within a predefined range of an integer value, such as -1, 0, or 1).

At block 1518, in accordance with a determination that the first range rate window index meets the predefined criteria, an estimated range rate is computed based at least in part on the first range rate window index difference. In some embodiments, the estimated range rate is computed using the processing circuit.

In some embodiments, the estimated range rate is computed according to the equation: $v_{r\_est} = v_{det}^2 + N_2 \cdot vun_2$, where $N_2 = N_1 + N_{diff}$, $v_{r\_est}$ is the estimated range rate, $v_{det}^2$ is the second detected range rate, $N_1$ is the first range rate window index, $N_{diff}$ is the first range rate window index difference, and $vun_2$ is the second range rate window size. In some embodiments, the techniques (e.g., algorithm(s)) assume that the range rate of the detected object does not change significantly (e.g., is constant or nearly constant) from the first received signal to the second received signal (e.g., the object does not have significant range acceleration or change in range rate from scan to scan).

In accordance with a determination that the first range rate window index does not meet the predefined criteria, computation of an estimated range rate based on the first range rate window index difference is foregone (e.g., the system does not compute an estimated range rate based on the first range rate window index difference and returns to block

1514 to calculate a new range rate window index based on a different range rate window index difference).

In some embodiments, in accordance with a determination that the first range rate window index does not meet the predefined criteria, a second range rate window index is computed for a different range rate window index difference to try and find a range rate window index that meets the predefined criteria. For example, in accordance with a determination that the first range rate window index does not meet the predefined criteria, a second range rate window index is computed based on a second range rate window index difference (e.g., a different range rate window index difference; a different value of $N_{diff}$). In some embodiments, the second range rate window index is computed based on the second range rate window index difference and one or more of the first detected range rate, the second detected range rate, the first range rate window size, or the second range rate window size, or a combination thereof. In some embodiments, the second range rate window index is computed using the processing circuit. In accordance with a determination that the second range rate window index meets the predefined criteria (e.g., the second range rate window index is within a predefined range of an integer value, such as −1, 0, or 1), an estimated range rate is calculated based on the second range rate window index difference. In some embodiments, the second range rate window index and/or the estimated range rate is calculated using the processing circuit.

One or more of the operations described with reference to blocks 1514, 1516, and 1518 (e.g., range rate unfolding; computing the range rate window index and the estimated range rate) can be performed outside of a traditional tracking algorithm (e.g., a Kalman filter) or a tracking module, with the detection(s) and unfolded range rate(s) (e.g., estimated range rate(s)) then being provided to a tracker. In some embodiments, the estimated range rate is transmitted to a tracking circuit. In some embodiments, the estimated range rate is transmitted to the tracking circuit using the processing circuit.

Detections can be associated with each other if their unfolded range rates match. In some embodiments, in accordance with a determination that the estimated range rate (e.g., of the detection of the first received signal and/or the second received signal) and an estimated range rate of a third received signal meet matching criteria, a detection of the second received signal with a detection of the third received signal are associated.

A range check can be performed to determine whether detections are to be associated with each other. A range check can include predicting a current range based on previous range and range rate values. For example, the predicted range can be determined according to the equation: $rangePredicted_2 = v_{r\_est}^1 \cdot cycleTime + range_1$, where $range_1$ is the estimated (e.g., detected or filtered) range of the object from the first received signal (e.g., the first scan), cycleTime is the time between the first received signal and the second received signal (e.g., the time between scans), and $v_{r\_est}^1$ is the estimated range rate from the first signal.

If the predicted range does not match the current detected range, then the detections are not associated. For example, the detections are not associated if the following relationship holds: $|rangePredicted_2 - range_2| > \Delta RangeThreshold$, where $range_2$ is the estimated (e.g., detected) range of the object based on the second received signal, and $\Delta RangeThreshold$ is the maximum allowable difference between the predicted range and detected range.

In some embodiments, the estimated range rate is a second estimated range rate, and a predicted range is determined based on a first detected range and a first estimated range rate that are based on the first received signal (e.g., and not the second received signal). A second detected range is determined based on the second received signal; and in accordance with a determination that a difference between the predicted range and the second detected range exceeds a range threshold, associating the second received signal with the first received signal is not performed.

Detections where the detected range rate has been unfolded can be flagged. In some embodiments, in accordance with a determination that the first range rate window index meets the predefined criteria and the first range rate window index difference is not zero, the estimated range rate is indicated as being based on a range rate window index difference other than zero.

An autonomous vehicle can be controlled using the estimated range rate computed in block 1518. In some embodiments, the autonomous vehicle is controlled using a control circuit.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   transmitting, using one or more transmitters, a first transmitted signal into an environment, the first transmitted signal corresponding to a first range rate window size;
   receiving, using one or more receivers, a first received signal including at least a portion of the first transmitted signal that has been reflected from an object in the environment;
   determining, using a processing circuit, a first detected range rate of the object based on the first received signal, wherein the first detected range rate of the object falls into a range rate window of a first series of range rate windows of the first range rate window size, and wherein the first detected range rate is associated with a first true range rate of the object according to a first offset value indicating a relative difference in range rate windows, of the first series of range rate windows, containing the respective first detected and true range rates;
   after transmitting the first transmitted signal, transmitting, using the one or more transmitters, a second transmitted signal into the environment, the second transmitted signal corresponding to a second range rate window size;
   receiving, using the one or more receivers, a second received signal including at least a portion of the second transmitted signal that has been reflected from the object in the environment;

determining, using the processing circuit, a second detected range rate of the object based on the second received signal, wherein the second detected range rate of the object falls into a range rate window of a second series of range rate windows of the second range rate window size, and wherein the second detected range rate is associated with a second true range rate of the object according to a second offset value indicating a relative difference in range rate windows, of the second series of range rate windows, containing the respective second detected and true range rates;

obtaining an expected difference in the first and second offset values;

computing, using the processing circuit and using the expected difference, the first and second detected range rates, and the first and second range rate window sizes, the first offset value indicating the relative difference in range rate windows, of the first series of range rate windows, containing the respective first detected and true range rates;

determining that the computed first offset value meets predefined criteria; and computing, using the processing circuit, an estimate of the first true range rate based on the first detected range rate and the first offset value.

2. The method of claim 1, wherein the first range rate window index difference is an integer.

3. The method of claim 1, wherein:

the first transmitted signal includes a first plurality of pulses having a first transmitter frequency and a first pulse repetition frequency, the first range rate window size corresponding to the first transmitter frequency and the first pulse repetition frequency; and the second transmitted signal includes a second plurality of pulses having a second transmitter frequency and a second pulse repetition frequency different from the first pulse repetition frequency, the second range rate window size corresponding to the second transmitter frequency and the second pulse repetition frequency.

4. The method of claim 1, wherein the first range rate window index is computed according to the equation $N_1 = (v_{det}^1 - v_{det}^2 - vun_2 \cdot N_{diff})/(vun_2 - vun_1)$, wherein $N_1$ is the first range rate window index, $v_{det}^1$ is the first detected range rate, $v_{det}^2$ is the second detected range rate, $vun_1$ is the first range rate window size, $vun_2$ is the second range rate window size, and $N_{diff}$ is the first range rate window index difference.

5. The method of claim 4, wherein the estimate of the first true range rate is computed according to the equation $v_{r\_est} = v_{det}^2 + N_2 \cdot vun_2$, wherein $v_{r\_est}$ is the estimated range rate, $v_{det}^2$ is the second detected range rate, $N_2 = N_1 + N_{diff}$, $N_1$ is the first range rate window index, $N_{diff}$ is the first range rate window index difference, and $vun_2$ is the second range rate window size.

6. The method of claim 1, further comprising:

determining that the second range rate window index meets the predefined criteria; and computing, using the processing circuit, an estimated range rate based on the second range rate window index difference.

7. The method of claim 1, wherein the first range rate window size is different from the second range rate window size.

8. The method of claim 1, wherein the first transmitted signal has a first pulse repetition frequency and the second transmitted signal has a second pulse repetition frequency different from the first pulse repetition frequency.

9. The method of claim 8, wherein the first range rate window size is based on the first pulse repetition frequency, and wherein the second range rate window size is based on the second pulse repetition frequency and is different from the first range rate window size.

10. The method of claim 1, further comprising:
transmitting, using the processing circuit, the estimate of the first true range rate to a tracking circuit.

11. The method of claim 1, wherein computing the first range rate window index is performed in response to gating criteria being met, wherein the gating criteria are based on the first received signal and the second received signal.

12. The method of claim 11, wherein the gating criteria are not based on the first detected range rate or the second detected range rate.

13. The method of claim 1, further comprising:
determining that the estimate of the first true range rate and an estimated range rate of a third received signal meet matching criteria; and;
associating a detection of the second received signal with a detection of the third received signal.

14. The method of claim 1, further comprising, to compute an estimate of a second true range rate:
determining a predicted range based on a first detected range and a first estimated range rate that are based on the first received signal;
determining a second detected range based on the second received signal; and
determining that a difference between the predicted range and the second detected range exceeds a range threshold; and
foregoing associating the second received signal with the first received signal.

15. The method of claim 1, further comprising:
determining that the first range rate window index meets the predefined criteria and the first range rate window index difference is not zero; and
indicating that the estimate of the first true range rate is based on a range rate window index difference other than zero.

16. The method of claim 1, wherein receiving the first received signal is performed with a first receiver of the one or more receivers, and receiving the second received signal is performed with a second receiver of the one or more receivers different from the first receiver.

17. The method of claim 1, wherein receiving the first received signal and receiving the second received signal are performed with the same receiver of the one or more receivers.

18. The method of claim 1, further comprising:
controlling, using a control circuit, an autonomous vehicle using the estimated range rate.

19. The method of claim 1, wherein the first range rate window index is computed so as to be disproportional to a difference between the second range rate window size and the first range rate window size.

20. The method of claim 1, wherein the first offset value comprises −1, 0, or 1.

21. The method of claim 1, wherein the predetermined criteria comprises a condition that is met in response to an absolute value of the first range rate window index being less than or equal to a threshold value.

22. The method of claim 21, wherein the threshold value is set to correspond to a maximum expected speed of other vehicles or objects that a vehicle is reasonably likely to encounter.

23. A system comprising
one or more computer processors; and
one or more non-transitory storage media storing instructions which, when executed by the one or more computer processors, cause performance of steps that include:
transmitting, using one or more transmitters, a first transmitted signal into an environment, the first transmitted signal corresponding to a first range rate window size;
receiving, using one or more receivers, a first received signal including at least a portion of the first transmitted signal that has been reflected from an object in the environment;
determining, using a processing circuit, a first detected range rate of the object based on the first received signal, wherein the first detected range rate of the object falls into a range rate window of a first series of range rate windows of the first range rate window size, and wherein the first detected range rate is associated with a first true range rate of the object according to a first offset value indicating a relative difference in range rate windows, of the first series of range rate windows, containing the respective first detected and true range rates;
after transmitting the first transmitted signal, transmitting, using the one or more transmitters, a second transmitted signal into the environment, the second transmitted signal corresponding to a second range rate window size;
receiving, using the one or more receivers, a second received signal including at least a portion of the second transmitted signal that has been reflected from the object in the environment;
determining, using the processing circuit, a second detected range rate of the object based on the second received signal, wherein the second detected range rate of the object falls into a range rate window of a second series of range rate windows of the second range rate window size, and wherein the second detected range rate is associated with a second true range rate of the object according to a second offset value indicating a relative difference in range rate windows, of the second series of range rate windows, containing the respective second detected and true range rates;
obtaining an expected difference in the first and second offset values;
computing, using the processing circuit and using the expected difference, the first and second detected range rates, and the first and second range rate window sizes, the first offset value indicating the relative difference in range rate windows, of the first series of range rate windows, containing the respective first detected and true range rates;
determining that the computed first offset value meets predefined criteria; and
computing, using the processing circuit, an estimate of the first true range rate based on the first detected range rate and the first offset value.

24. One or more non-transitory storage media storing instructions which, when executed by one or more computing devices, cause performance of steps that include:
transmitting, using one or more transmitters, a first transmitted signal into an environment, the first transmitted signal corresponding to a first range rate window size;
receiving, using one or more receivers, a first received signal including at least a portion of the first transmitted signal that has been reflected from an object in the environment;
determining, using a processing circuit, a first detected range rate of the object based on the first received signal, wherein the first detected range rate of the object falls into a range rate window of a first series of range rate windows of the first range rate window size, and wherein the first detected range rate is associated with a first true range rate of the object according to a first offset value indicating a relative difference in range rate windows, of the first series of range rate windows, containing the respective first detected and true range rates;
after transmitting the first transmitted signal, transmitting, using the one or more transmitters, a second transmitted signal into the environment, the second transmitted signal corresponding to a second range rate window size;
receiving, using the one or more receivers, a second received signal including at least a portion of the second transmitted signal that has been reflected from the object in the environment;
determining, using the processing circuit, a second detected range rate of the object based on the second received signal, wherein the second detected range rate of the object falls into a range rate window of a second series of range rate windows of the second range rate window size, and wherein the second detected range rate is associated with a second true range rate of the object according to a second offset value indicating a relative difference in range rate windows, of the second series of range rate windows, containing the respective second detected and true range rates;
obtaining an expected difference in the first and second offset values;
computing, using the processing circuit and using the expected difference, the first and second detected range rates, and the first and second range rate window sizes, the first offset value indicating the relative difference in range rate windows, of the first series of range rate windows, containing the respective first detected and true range rates;
determining that the computed first offset value meets predefined criteria; and
computing, using the processing circuit, an estimate of the first true range rate based on the first detected range rate and the first offset value.

* * * * *